United States Patent [19]

Wright

[11] 3,924,879

[45] Dec. 9, 1975

[54] FLEXIBLE FILM TRANSPARENCY DISPLAY MAKERS

[76] Inventor: John S. Wright, 6115 N. Lake Drive Court, Milwaukee, Wis. 53217

[22] Filed: Mar. 28, 1974

[21] Appl. No.: 455,571

Related U.S. Application Data

[63] Continuation-in-part of Ser. No. 221,898, Jan. 31, 1972, abandoned, which is a continuation-in-part of Ser. No. 43,086, June 3, 1970, abandoned.

[52] U.S. Cl. ............ 282/28 R; 40/106.1; 40/125 A; 281/3 R
[51] Int. Cl.² .......................................... B41L 1/16
[58] Field of Search ........... 35/26, 28, 66; 40/106.1, 40/125 A; 281/3 R; 282/1 R, 28 R; 46/DIG. 1

[56] References Cited
UNITED STATES PATENTS

| | | | |
|---|---|---|---|
| 2,585,924 | 2/1952 | Freedman | 40/125 A X |
| 2,588,572 | 3/1952 | Potteiger | 282/1 R X |
| 2,648,924 | 8/1953 | Brewster | 40/2 |
| 3,383,121 | 5/1968 | Singer | 282/28 R |
| 3,608,219 | 9/1971 | Verebay | 281/3 R X |
| 3,827,164 | 8/1974 | Hale | 35/66 X |

*Primary Examiner*—Harland S. Skogquist
*Attorney, Agent, or Firm*—Quarles & Brady

[57] ABSTRACT

Film transparency displays to be viewed by projecting light through them as mounted on light reflecting surfaces, windows, light boxes, overhead projectors and slide projectors are made by imprinting an image on a soft flexible transparent film with at least one glossy surface. Such flexible film transparencies adhere without adhesives or other aids to smooth, hard, glossy surfaces such as glass, acrylics, and other plastics. The flexible film transparencies are stored on indexed light reflecting pages having smooth hard glossy surfaces which may be bound in books. Slides are made by adhering flexible film transparencies to acrylic plates, and photographic films may be adhered to the flexible film transparencies.

1 Claim, 19 Drawing Figures

Inventor
John S. Wright
By
Whalen, Whalen, House & Clemency
Attorneys

FLEXIBLE FILM TRANSPARENCY DISPLAY MAKERS

CROSS-REFERENCE TO RELATED APPLICATION

This is a continuation-in-part of the inventor's copending application, Ser. No. 221,898 filed Jan. 31, 1972, entitled "Decorative Film & Storage Book," which is a continuation-in-part of Ser. No. 43,086 that was filed on June 3, 1970, both applications now abandoned.

BACKGROUND OF THE INVENTION

A transparency display, as that phrase is used here, refers to one or more transparencies made up of transparent images imprinted on transparent films and viewed by shining light through the films and images. Transparency displays are most commonly encountered as photographic slides viewed with a slide projector, or as transparencies used with an overhead projector to project the image on to a screen. However, transparancies may also be placed on a light box, or a window, or even viewed against a light-reflecting substrate, be it a page of a book or a display board. The image may be a photograph, a drawing, words, numbers, charts, diagrams, graphs or other characters. In the past, such transparancies have used a relatively rigid and hard film, ranging from glass plates to the cellulose materials such as are used in photographic films, to polyethylene terephthalate films such as are disclosed in the applicant's earlier Pat. No. 3,253,358 of May 31, 1966 and 3,524,703 of Aug. 18, 1970. The present invention involves a novel transparency, which, unlike those of the prior art, is made from a soft, flexible film preferably polyvinyl chloride (hereinafter PVC).

The property of soft transparent films, such as PVC, which is employed in the present invention, to adhere tenaciously, but removably, to a hard, smooth glossy surface, has been known for decades. U.S. Pat. No. 2,586,039 discloses the use of that property to make menu signs, to mount photographic prints, to make games and to create fanciful displays. U.S. Pat. No. 2,293,887 uses that property to mount fanciful displays, and in No. 2,585,924 it is used to make a game, such as checkers. In British Patents Nos. 870,178 and 818,680 that property was employed to make signs and display boards. In U.S. Pat. No. 3,274,706 that property was used in a book to affix overlay that impart three dimensional, tactile properties as well as colors to pictures of trees.

Notwithstanding the apparent variety of applications of soft films in the prior art, essentially all that the prior art teaches is the printing of an opaque shape, such as a leaf or a letter, or a block of color, all of which are essentially silhouettes on PVC for mounting a glossy hard-surface either at some predetermined location or randomly, and when not so mounted, these PVC shapes are haphazardly stored like parts to a jigsaw puzzle. The prior art nowhere suggests the use of soft film for a transparency for slide projector presentations, nor does the prior art suggest the decorative and educational uses of transparencies, as distinguished from colored silhouettes on light boxes or windows or the like. The prior art contains no concept of any systematic storage of any kind of transparencies for quick retrieval and convenient reuse, and which allows the transparancies to be read or viewed while in storage.

Similarly, problems exist in the prior art transparency displays. Common to all resuable transparencies is the fact that the transparencies are preprinted using special photographic or printing equipment, so the user cannot modify a presentation to suit the needs of a specific purpose. While slide transparencies are commonly stored and separately indexed, the displays frequently are either difficult or impossible to view in their storage locations, and cannot be seen or evaluated without a specical viewer or a projector. In slide displays, each slide has its own frame, and while the user can elect a particular sequence of storage and index it on a separate sheet, it is a laborious filing task to remove or replace the slides which are all but invisible without a special viewer with auxiliary light.

The present invention combines the hitherto unrelated and disparate properties of the soft, flexible films with those of the conventional transparency, to provide a transparency display that does not have the problems of past displays and opens up new and numerous avenues for the use of transparency displays.

SUMMARY OF THE INVENTION

The present invention relates to a system for storing transparency displays, and more particularly the invention resides in the combination of a carrier film which is transparent and has a glossy surface, a backing sheet which is fastened to the carrier film next to a surface adjacent the glossy surface and which is opaque and light colored, and a plurality of film transparencies which are made of a soft, flexible transparent material with at least one glossy surface and which are adapted to bear images by projecting light through them, the plurality of film transparencies being adhered to the carrier film without adhesives by pressing the glossy surfaces of the film against the glossy surface of the carrier film. The invention also resides in a slide transparency for use with a slide projector comprising the combination of a slide frame which includes a carrier plate of rigid transparent material that has at least one smooth, glossy surface and a film transparency of soft, flexible material, which has a glossy surface, which is adapted to bear an image to be viewed by passing light through it and which is adhered without adhesives to the glossy surface of the rigid transparent material in the slide frame by pressing it against said glossy surface.

As a result of the foregoing invention, a wide variety of objects and advantages that hitherto have been impossible, now become available to persons using film transparencies for various purposes. For example, in a preprinted transparency display having the images preprinted on the film transparencies, an outline or a duplicate of the image may also be printed either on the opaque backing sheet, or on the carrier sheet to mark the storage location of the transparency on the carrier sheet so that the transparency can readily be found for use in a projected display and equally easily restored on its storage position. These advantages become particularly important in educational materials, for these allow the child to enhance his learning experience by making his own display, either from his own imagination or from preprinted instructions, and to restore the transparencies to the proper storage location for easy reuse. In another application of the foregoing invention, the transparency may be entirely blank and a carbon paper inserted between the carrier sheet and the backing sheet so that the teacher, salesman or other user can type or otherwise imprint on the transparency the images or information he wishes to convey, and simultaneously imprint a carbon copy on the carrier sheet so that the display once made can readily be stored for quick retrieval and reuse. This allows the instructor, salesman, or other user complete flexibility in creating any type of transparency presentation or program, both called displays here, that suits his need.

The foregoing invention permits what has hitherto been entirely impossible, that is, the making of a slide transparency display by the user to include anything desired, without any special equipment. Moreover, the present invention allows the convenient, compact and readily retrievable storing of ordinary photographic slide transparencies. The slide transparency is made by using a transparent plate as the slide frame, and fixing the image to a soft, flexible transparency, requiring the user to have a supply of only as many frames as would be used in one desired sequence of slides such as one cartridge load, for any indefinite number of slides. Moreover, the transparencies can readily be viewed in their storage position against the light reflecting, opaque backing sheet without a special viewer, as one would read a book. Photographic slides printed on cellulose films will adhere tenaciously to the PVC transparency and may be placed on the transparency in the same manner as an imprinted image and hence can be mounted on a slide of the invention or restored to a storage device of the present invention just like any other flexible transparency.

It is also an objective to produce a decorative or educational article which will removably adhere to glass or other smooth surfaces to decorate windows and other surfaces for holidays such as Halloween, Valentine's Day, Fourth of July and the like, or to provide teaching displays and to provide a storage book in which it can be systematically stored and indexed for convenient retrieval and reuse.

DETAILED DESCRIPTION OF THE PREFERRED EMBODIMENTS

Figures 1, 2, 3, 4, 5, 6, 7:
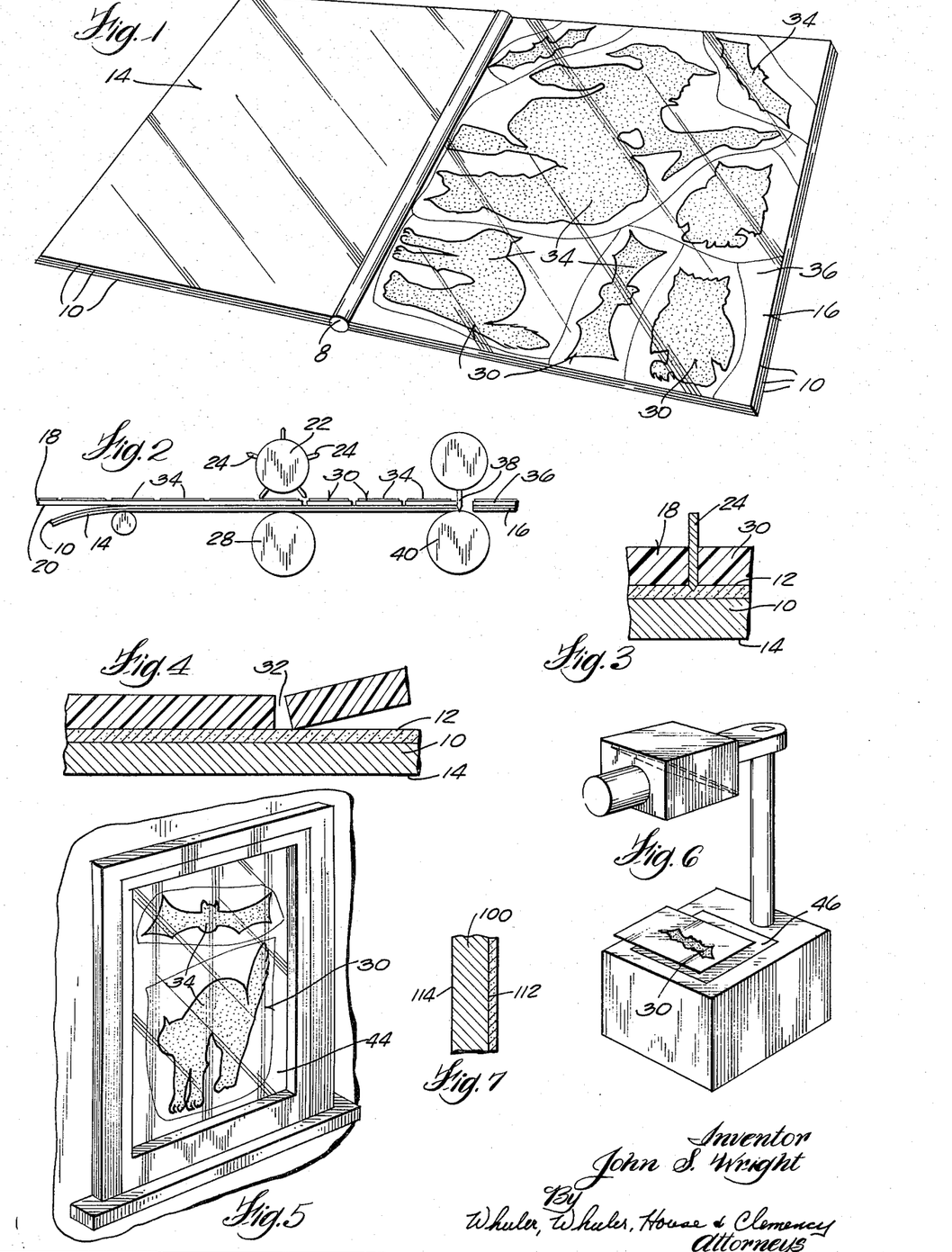
FIG. 1 is a view in perspective of a book embodying the invention.
FIG. 2 is an enlarged fragmentary detail view showing the step of assembling plastic stock with coated leaf material and further steps of die cutting the articles from the plastic stock and, on occasion, completely severing the resulting pairs of leaves with the plastic stock mounted thereon.
FIG. 3 is a further enlarged detail view in cross section diagrammatically illustrating severance of a decorative article from plastic stock and an underlying coated leaf.
FIG. 4 is a view on the scale of FIG. 3 showing in section the step of removing the decorative article from the book leaf upon which it has been mounted.
FIG. 5 is a view in perspective fragmentarily illustrating a window upon which decorative articles are mounted as comtemplated by the invention.
FIG. 6 is a view showing one of the articles mounted for projection by means of an overhead projector.
FIG. 7 is a fragmentary detail view in section through a modified book leaf.

The book 8 comprises a plurality of leaves 10 each of which has one side or page 12 which is filled or coated, and another side 14 whcih is not so smooth. The leaves may be made of many materials including paper and plastic. Particulars herein are given by way of example and not by way of limitation. In practice, I may use a very commonly available paper known as chrome-coat and used in the printing industry. It has one filled face used as a base on which pictures may be printed. The unfilled face 14 is not nearly as smooth and PVC will not adhere to it. The difference between the two pages on the opposite sides of a given leaf will be apparent visually to some people and tactually to most people. I have used successfully coated paper having a thickness pf 0.001 inches.

In lieu of using paper having a filled face or coating, I may use a leaf 100 which has an unfilled face or uncoated face 114 and a lamination 112 of resin which is permanently attached to the leaf 100 by adhesive or otherwise and to which PVC will adhere as it does to the filled face 12.

Between each pair of leaves 10, the book contains a sheet 16 of synthetic resin film. It is desirably, although not necessarily, transparent. Among the wide variety of plastics that may be used, it is my practice to use polyvinyl chloride (PVC) film having a thickness of approximately 0.008 to 0.015, a thickness of 0.012 being preferred. Even in the case of pieces of this material which are only a couple of inches in length, the material is too limp to be self-supporting. It bends over under its own weight.

In the preferred practice of the invention, the first step is to print at 34 appropriate pictures on the film stock 18 from which the sheets 16 are to be cut.

Next, the film stock 18 is fed onto the paper stock 10 as shown in FIG. 2 with the unprinted face 20 of the plastic contacting the coated face 12 of the web stock 10. Because of the glassy smoothness of the chrome coated page 12, the PVC will cling to it. It is an important advantage to have these webs thus tightly associated (and without adhesive) during the blanking and die cutting operations.

The blanking die 22 has knives 24 which penetrate the plastic film 18 as shown in FIG. 3 but do not penetrate the paper web 10. In the functioning of the die 22, as the combined webs pass beneath the die and are supported on roll 28, successive individual decorated articles 30 are severed from the plastic film but remain in place on the underlying web 10 due to the adhesion above described. On account of the transparency of the film 18, it is not necessary that the die cuts 32 register precisely with the illustrations printed at 34 in pigment on the top surface of the plastic film. Even so, it is a very desirable consideration that the two webs adhere and therefore move together, thus avoiding accidental displacement.

After the width of each given sheet has passed beneath the blanking die 22, the sheet 16 and the film 36 superimposed thereon are completely severed by a cut-off die 38, the work being supported on roll 40.

The resulting sheets are preferably then assembled by any form of ring to make the book 8. Each such sheet carries with it on its coated face, the plastic film 36 and the severed articles 30. The articles continue to adhere to the coated surface which underlies them. They do not adhere at all to the opposing surface 14 of the next consecutive sheet.

To celebrate the holiday for which the decorative articles have been prepared, these are withdrawn manually from their supporting page in the book. With the picture face outermost, the plastic articles may be attached to a piece of window glass 44 or a piece of tile or the like. The plastic overlay 36 from which the article was die cut remains bound in the book, superimposed, as it was originally, on the smooth surface of the leaf. Because the articles are so completely limp, storage of them might be a problem were it not for the fact that after they have been removed from the place of display, they can be put back onto the page and into the opening from which they were taken and will remain stored in the book until need again.

If desired, the pictures may readily be projected by simply placing one of the articles 30 on the stage 46 of an overhead projector as shown in FIG. 6. In other words, the ink 34 applied to the faces of the respective articles by way of enhancing their decorative effect is preferably not opaque. It may be translucent but is preferably almost completely transparent.

Figure 8:
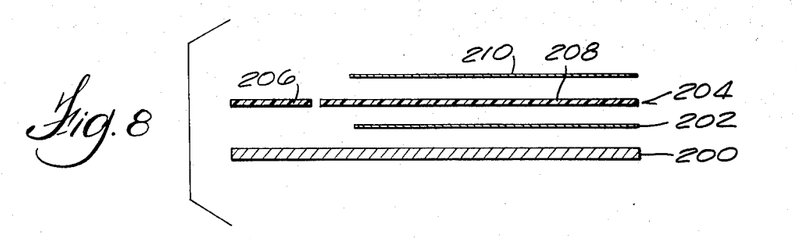
FIG. 8 is an expanded cross sectional view through a carrier sheet and limp overlay and frame of my invention.
Figure 9:
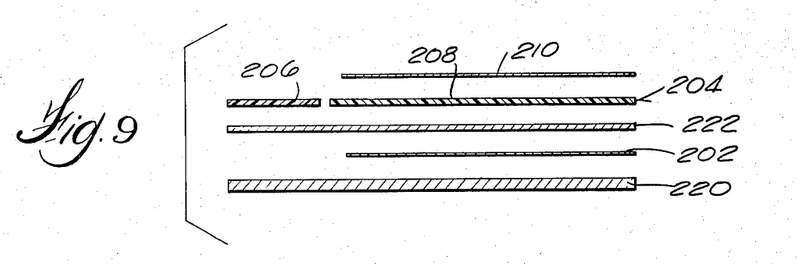
FIG. 9 is a view like that of FIG. 8 showing a modification of the layer structure.

FIGS. 8 and 9 show modifications of my file and storage book pages. In FIG. 8 the base layer 200 is special cast-coated paper which is treated to produce a glass-smooth surface. Layer 202 is a layer of printing forming an image or images tracing images in an overlying layer. The ink used is desirably an extremely thin layer which is itself glass-smooth like the underlying cast-coat paper, or which at least does not destroy the smoothness of the paper 200 sufficiently to interfere with adhesion, as described elsewhere herein. Layer 204 is a film of limp plastic, and is subdivided into frame areas 206 and image carrying areas 208. Layer 210 is a further ink image complementary to the image of layer 202. The character of the surface produced by ink image 210 is not critical, since this surface is not required to adhere to the glass smooth surface of paper 200 but desirably the ink used on this surface also has a glass-smooth characteristic, so that in use either surface of piece 208 may be applied to a smooth surface where it will remain without adhesives until removed.

The device of FIG. 9 is a further version of my invention in which layer 220 is a base sheet of any type of paper. It does not have to be abnormally smooth, unlike the base layer 200. Printed on layer 220 is a layer 202 which is an image complementary to an image in a superposed layer. Layer 222 is a plastic film laminated to base layer 220 and layer 202 to form a glassy-smooth surface thereon. A transparent plastic film is the preferred lamination material comprising layer 222. Layer 204 is a limp plastic film having glass-smooth surfaces and subdivided into the frame areas 206 and image carrying areas 208. As before, the image carrying area 208 should not be coestensive with the image formed by an ink layer 210, which is carried by piece 208. Both manufacture and use of my unit are simpler if piece 208 is not coextensive with image layers 210 and 202 but has a greater extent and a simpler and more regular outline.

It will be understood that in either the version of FIG. 8 or the version of FIG. 9 the frame area 206 may also carry one or more images corresponding to ink layers 210 and 202, if desired. For instance in a given teaching application a picture of a cow might form image 202 and the word "cow" might be printed as an image on frame portion 206 adjacent the storage location for piece 208 bearing the image of the cow, so that when piece 208 is removed from storage, the image of the cow is separated from the word naming it, while it is stored adjacent to the word. It will be evident that the arrangement of the printed images depends on the use of the device and not upon the use of the invention. However, the use of the invention does facilitate the employment of varied teaching techniques, sales techniques, and the like.

For instance, the pieces 208 may be used as an overlay for a transparency on the stage of an overhead projector, as for instance the transparencies of my Pat. No. 3,524,703 or my Pat. No. 3,253,358, among others.

An important aspect of my invention is a method of producing and storing limp film displays for use as overlays, window decorations, and the like. Insofar as the method is a production method it involves the steps of producing an image on a base layer, producing a smooth surface on the base layer, producing an image on an overlay and frame layer composed of smooth surface limp plastic film, adhering to the overlay and frame layer to the base layer without adhesives making use of the character of the two layers to secure adhesion, cutting the adherent layers all the way through to form sheets of the final size desired, cutting the limp plastic frame overlay layer to form separate overlays with a frame about each, and the optional final step of binding the pages so that the smooth surfaces of the overlays are adjacent rough surfaces of an adjoining page.

The carrier sheets of my invention may be index tabbed with legends on one side only of the tab, to keep the proper rough-smooth alternation.

It is also a desirable feature of my invention that the images on the carrier and on the film may be in different transparent colors. They produce a third color when superimposed. Any fault in the printing is instantly apparent because the third color is not present in that portion of the image. The entire area of the film may be a single transparent color, for some uses. A map may be so constructed with a separate film of a different color for each adjacent state or other division or feature.

Figure 10:
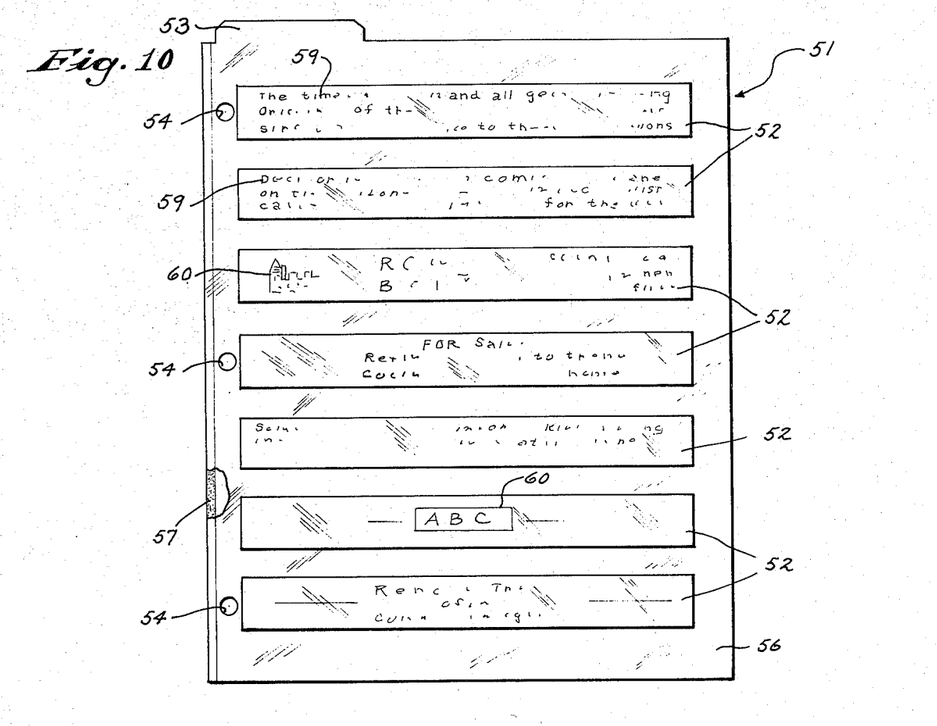
FIG. 10 is a plan view of a storage page with transparencies mounted on it according to the present invention.

FIG. 10 illustrates another embodiment of the invention showing a storage page 51 bearing seven flexible transparencies 52. The transparencies 52 as shown in FIG. 10 would be used with an overhead projector and are appropriately dimensioned and shaped for that purpose. An indexing tab 53 projects from the upper edge of the storage page 51, and three holes 54 are cut along its left margin so that it can be mounted in a conventional three-ring binder for convenient storage and retrieval.

Figure 12:
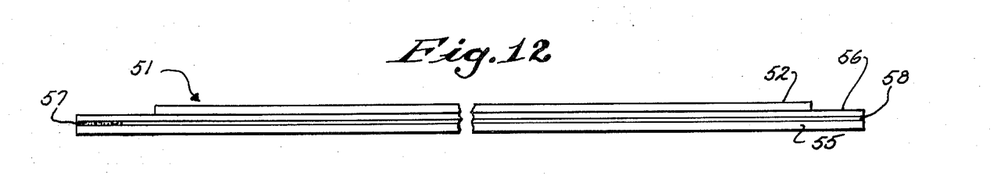
FIG. 12 is a view in section of the storage page of FIG. 10 with a carbon sheet inserted therein and with transparencies mounted thereon.
Figure 13:
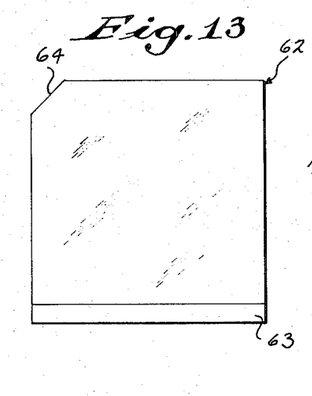
FIG. 13 is a plan view of a transparency slide frame according to the present invention.

FIG. 12 illustrates in section the composite construction of the storage page 51. Obviously the dimensions of the layers as seen in section in FIG. 12 are disproportionate, for FIG. 12 is a diagrammatic representation intended to illustrate the elements and their interrelation, not a scale or photographic reproduction of actual structure. The bottom layer in FIG. 12 is an opaque backing sheet 55 which, in the embodiment shown, is an ordinary sheet of paper, which has a strip of adhesive 57 on its left margin, which joins the backing sheet 55 and a carrier film 56 lying on top of the backing sheet 55. The carrier sheet 56 shares the same dimensions with the backing sheet 55 and the two are stacked in alignment. The carrier film 56 is a sheet of transparent polyethylene terephthalate, which is commercially available under a number of well known trade names, and which is characterized by having a hard, smooth glossy surface, good optical properties, excellent dimensional stability, resilient flexibility and a high resistance to creasing. As the storage page 51 would be supplied to a user, a sheet of carbon paper 58 would be provided and lie between the carrier film 56 and the backing sheet 55 to serve as a duplicating medium oriented to mark on the surface of the backing sheet 55. In lieu of the carbon paper 58, an intermediate layer 58 of one of the well known coatings that serve the same function might be supplied.

The polyethylene terephthalate carrier film 56 is 0.004 inches in thickness and mounted on its surface are the seven transparencies 52, which are strips of soft, polyvinyl chloride (PVC) film, 0.008 inches thick having at least one surface treated to receive printing, writing or typing. The thicknesses of the Ph carrier film 56 and the transparencies 52 presented here are simply those used in the preferred embodiment and are not critical to the invention. The PVC flexible transparencies 52 have soft, glossy surfaces, although the surfaces may not be uniformly smooth but have surface aberrations that are visible when one looks through it. The flexible transparencies 52 will adhere tenaciously to the surface of the carrier film 56 without adhesive or any mechanical aid because of the natural properties of the two materials, which are amply described and discussed in the prior art patents cited above in the recitation of the background of this invention.

Figure 11:
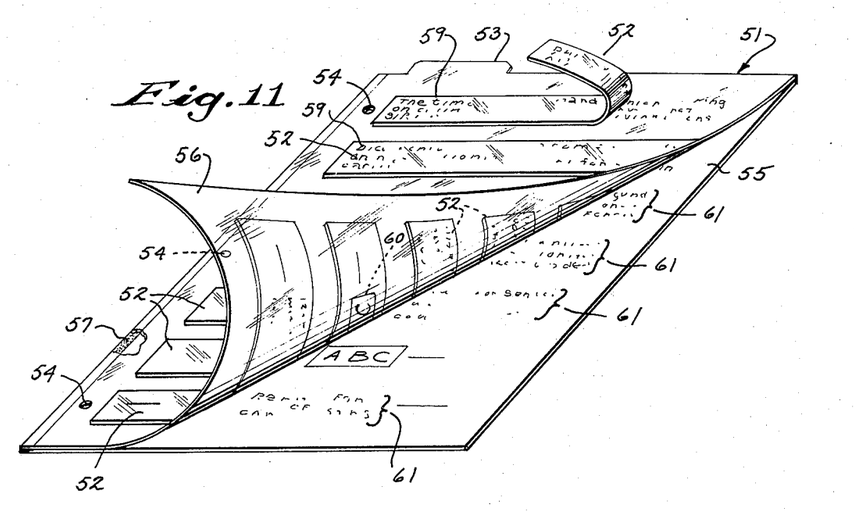
FIG. 11 is an isometric view of the storage page with transparencies shown in FIG. 10 with a portion of the carrier sheet lifted.

The embodiment of the invention illustrated in FIGS. 10, 11 and 12 is a tremendously effective tool for anyone who prepares reusable presentations for use with an overhead projector, or a light box, and probably most numerous among these are teachers who prepare their own lessons and lectures for repeated use in different classes or terms. Such persons would acquire embodiments of the invention shown in FIGS. 10 through 12 with the transparencies 52 mounted on the carrier film 56 and the carbon paper 58 in place between the carrier film 56 and the backing sheet 55. The user can then place the composite storage page 51 with the transparencies 52 into a typewriter to type onto the transparencies 52 whatever text 59 he wishes, or he can draw or print whatever images 60 or text 59 that he wishes, at the same time imposing the same text 59 or images 60 on the backing sheet 55 by means of the carbon paper 58. The text 59 or images 60 thus transferred onto the backing sheet and appearing through the transparent carrier film 56 serve as indicia locating the proper storage position for that transparency 52 and as a record of the contents of that transparency for use by the user in presenting a program. After he has completed preparation of his presentation, he may remove and discard the carbon paper 58. The carbon copy reproduction 61 of the text 59 or images 60 on the backing sheet 55 will serve as a permanent indicator of the proper location of the corresponding transparency 52. Hence, when the transparencies 52 have been removed from the composite storage page 51 for use in a presentation, they can easily be returned to their proper place and conveniently stored for quick retrieval whenever they are to be used again. Also, the presentation can be read as easily as one would read a book, whether or not the transparencies 52 are in their storage positions. In addition to the above described objects of this feature, the copy of the contents of the transparency 52 provides a permanent record in the event that the transparency is misplaced, lost, destroyed or worn-out.

The embodiment shown in FIGS. 13 through 17 employs flexible transparency displays to make slide transparencies which can be used in the conventional, well known 35 millimeter slide projector, or which can be dimensioned for use in the 2 ¼ inch by 2 ¼ inch slide projector, or any other desired size. FIG. 12 is a plan view of a slide frame 62, which is 2 inches on a side, for use in a 35 millimeter slide projector, and which consists of a plate of transparent acrylic with an opaque lower margin 63 and a beveled corner 64. The acrylic is a common material sold under several trade names and is characterized by its extraordinary strength and excellent optical properties, being perfectly clear, glossy and smooth, but glass might also be used though it would be somewhat heavier and more fragile. Unlike the conventional slide frame which is usually an open center plastic or cardboard square permanently affixed about the periphery of one specific transparency, the slide frame 62 of the present invention is designed for use and reuse with any number of different flexible transparencies 52 of the present invention.

Figure 14:
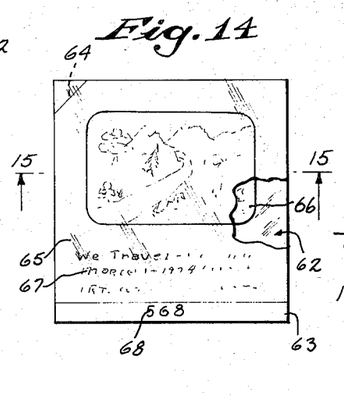
FIG. 14 is a plan view with portions broken away of a photographic transparency and a flexible transparency mounted on a slide frame shown in FIG. 13.
Figures 15, 17, 18:
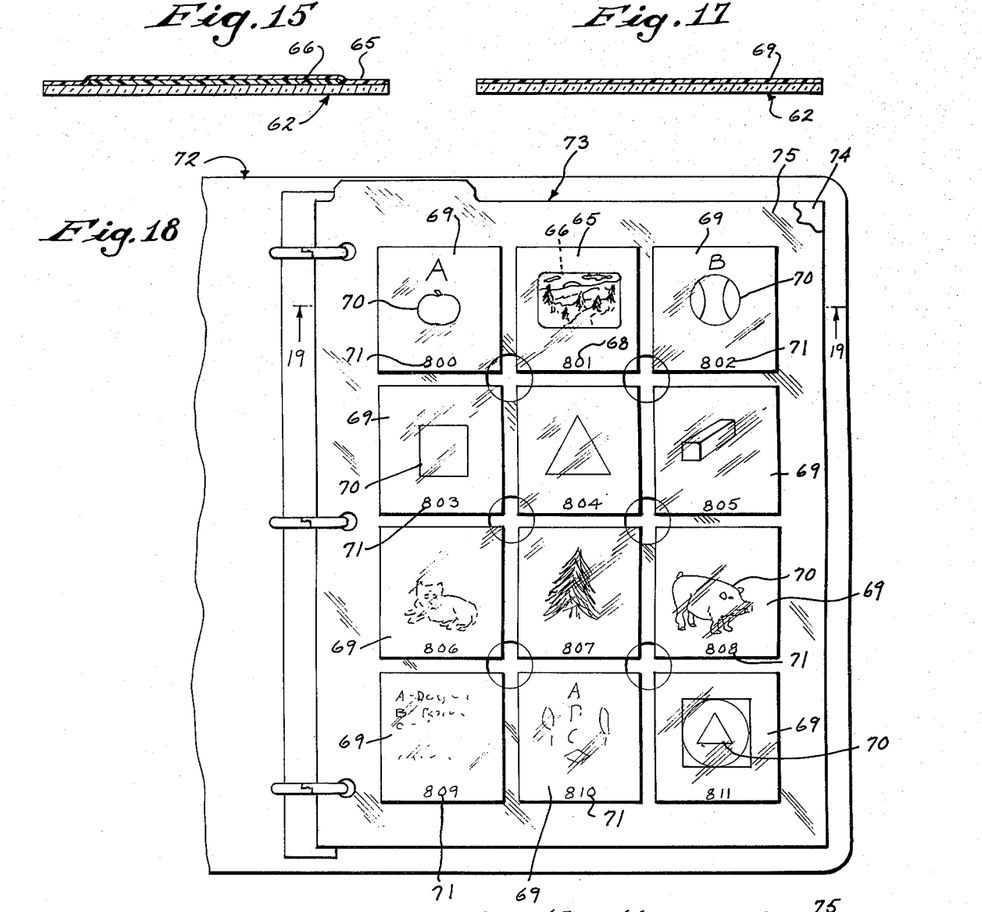
FIG. 15 is a view in section along the line 15—15 in FIG. 14 of a slide frame with a photographic transparency and flexible transparency mounted thereon.
FIG. 17 is a view in section along line 17—17 in FIG. 16 of the slide frame with the printed transparency mounted thereon.
FIG. 18 is a plan view of a portion of the ring-binder with a storage page according to the present invention having slide transparencies mounted thereon.

FIGS. 14 and 15 illustrate a composite slide transparency with frame 62. The frame 62 has a square transparency 65 of 0.008 inch PVC film mounted on its surface and adhering tenaciously thereto without an adhesive by virtue of the natural properties of the two materials in the same manner as is explained above in connection with the previously described embodiments. Between the flexible transparency 65 and the slide frame 62 is a photographic transparency 66 of the conventional sort on a cellulose-base film. The cellulose film of the photographic transparency 66 has certain properties in common with the acrylic plate of the slide frame 62, glass and polyethylene terephthalate that are important here, to wit: it is relatively rigid, and has a hard, smooth glossy surface so that it will adhere tenaciously to the soft PVC film of the flexible transparency 65, but will not adhere to either acrylic, glass or polyethylene terephthalate or other similar materials.

Hence the flexible transparency 65 is made up of the PVC film with the photographic transparency 66 adhered to one surface, with an inscription or text 67 in the lower margin below the photographic transparency 66 and an indexing number 68 along the bottom margin adjacent to the opaque lower margin 63 of the slide frame 62 so that the indexing number 68 (which in this instance is arbitrarily selected for illustration as "568") may easily be read, and not be projected onto the screen. The beveled corner 64 of the slide frame 62 allows a portion of the flexible transparency 65 to extend beyond the frame 62 so that it may be easily grasped to be stripped off of the slide frame 62 when desired.

Figure 16:
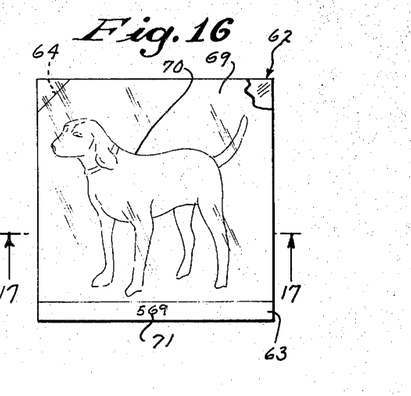
FIG. 16 is a plan view of the slide frame as shown in FIG. 13 with a printed flexible transparency mounted thereon according to the present invention.

In another embodiment shown in FIGS. 16 and 17, a flexible transparency 69 is made by printing an image 70, in this case of a dog, onto the soft, flexible PVC film, together with an indexing number 71 (in this case number "569") in the lower margin, and mounting this flexible transparency 69, in the same manner as described above, onto a slide frame 62. The potential of this type of slide transparency can be visualized more readily in connection with the storage means for the transparencies 65 and 69, which is illustrated in FIGS. 18 and 19.

Figure 19:
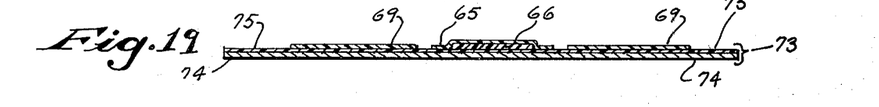
FIG. 19 is a view in section along the line 19—19 in FIG. 18 of the storage page with flexible slide transparencies mounted thereon.

FIG. 18 shows a portion of a three-ring notebook 72 with a storage page 73 bound in it, and the storage page 73 is shown in section in FIG. 19. The storage page 73 is made up of a rigid backing sheet 74 of an opaque material, such as cardboard, with a glossy transparent carrier film 75 on its upper surface. The glossy carrier film 75 on the rigid backing sheet 74 is bonded to the surface of the rigid backing sheet 74 to make a single member having one smooth, hard glossy surface, and although the glossy film 75 may consist of a filler used with paper products to achieve such a surface, it is preferably a polyethylene terephthalate carrier film 75 that is bonded to the rigid backing sheet 74. The rigid backing sheet 74 is a light colored, opaque material with an index tab 76 in its upper left hand corner, and it has twelve sequential indexing numbers 77 (numbers "800" through "811") printed on it. The indexing numbers 68, 71, and 77 also serve as indicia for locating the transparencies 65 and 69 in their proper storage position.

Twelve transparencies 65 and 69 are mounted on the glossy film 75 of the rigid backing sheet 74 so that index numerals 77 on the transparencies 65 and 69 are superimposed on the corresponding index numerals 77 printed on the backing sheet. Where the images 78 are preprinted on the transparency 69, it is also feasible to preprint duplicates of those images on the backing sheet 74 in alignment with those images 78 on the transparency 69. Thus both the numerals 77 and the duplicate images serve as locating indicia. However, where a photographic transparency 66 is to be mounted onto the flexible transparency 65, the indexing number 77 alone will serve adequately to locate the proper place for the slide transparency 65. Holes 76 through the backing sheet 74 and the carrier film 75 provide a convenient access for pushing up a corner of the flexible transparencies, 65 and 69 so they can easily be grasped and peeled off of the carrier film 75.

Thus for a slide transparency display, one needs only as many slide frames 62 as will fit in the cartridge of his projector or as he may require for a presentation, and the flexible transparencies 65 and 69 are conveniently and compactly sotred in three-ring notebooks 72 tabbed and indexed for rapid retrieval. To make a slide presentation utilizing the present invention, one need only mount his photographic transparencies onto the squares of flexible PVC to make flexible transparencies 65, or type, print or draw whatever image or text he prefers onto the squares of flexible PVC to make his own flexible transparency 69, or, particularly for elementary teaching situations, utilize preprinted transparencies 69. Having made the flexible transparencies 65 and 69 and stored them on storage pages 73 in the three-ring book, utilizing the index tabs 76 and the indexing numbers 77, he may readily retrieve the desired flexible transparencies to make a slide presentation by mounting those transparencies onto slide frames 62 which will support the flexible transparencies for projection in any conventional slide projector. When he has completed his use of the particular transparency presentation, he can readily remove the transparencies 65 and 69 from the slide frame 62 and replace the flexible transparencies 65 and 69 in their proper locations on the storage page 73 in the storage book 72, leaving the slide frame 62 ready for use in another presentation with different flexible transparencies.

The advantages of the slide transparencies according to the present invention can be readily deduced by those who use conventional prior art slide transparencies. If the backing sheet 74 is of a light colored, light reflecting material, even the images on photographic slides can be discerned when stored on the backing sheet 74, and larger simpler images and texts are comfortably viewed and read on the backing sheet 74. Generally, slide projectors are more commonly used by hobbyist and lecturers than by teachers, but the present invention will greatly facilitate the use of slide presentations for educational purposes. using the hobbyist as an example, however, is is manifest that he can view his collection of transparencies much as he would read a book. By contrast, using the conventional prior art slide mountings and storage means, the hobbyist needs a special viewer to examine his slides one by one and they are stored either in special boxes or in cartridges with a separate contents listing. In order to assemble a slide presentation using the present invention, the user can readily find the page 73 or pages 73 bearing the subject matter he wishes to include and he can select from that page 73 or pages 73 those transparencies 65 or 69 best suited to his purpose and mount these on his frames 62, his entire supply of which can conveniently be stored in a single projector cartridge. By placing the slide frame 62 with the selected flexible transparencies 65 or 69 mounted on them into the projector cartridge, the presentation may then be automatically projected on a screen in the normal manner. When the presentation is completed, the flexible transparencies 65 or 69 are easily replaced in their storage position and compactly stored for ready retrieval and another use.

I claim:

1. A product for making and storing transparency displays comprising the combination of a carrier sheet of a transparent material having a glossy surface;

a backing sheet of opaque material bound to said carrier along one edge and adjacent a surface of said carrier sheet opposite said glossy surface;

a pluraity of transparency films, having a glossy surface and being trasparent, soft and flexible, and being removably adherent to said glossy surface of said carrier sheet without adhesive, solvent or fusion by pressing said glossy surface of said transparency films against said glossy surface of said carrier sheet, said transparency films being adapted for receiving imprinted images;
and a duplicating medium between said carrier sheet and said backing sheet to transfer to said backing sheet duplications of images imprinted on said transparency films.

* * * * *